United States Patent [19]
Tempest, Jr.

[11] Patent Number: 5,741,416
[45] Date of Patent: Apr. 21, 1998

[54] WATER PURIFICATION SYSTEM HAVING PLURAL PAIRS OF FILTERS AND AN OZONE CONTACT CHAMBER

[75] Inventor: Gerard F. Tempest, Jr., Durham, N.C.

[73] Assignee: Tempest Environmental Systems, Inc., Durham, N.C.

[21] Appl. No.: 721,309

[22] Filed: Oct. 15, 1996

[51] Int. Cl.$^6$ .......................... B01D 17/12; B01D 36/02
[52] U.S. Cl. .......................... 210/90; 210/96.1; 210/97; 210/192; 210/195.1; 210/241; 210/259; 210/340
[58] Field of Search .......................... 210/85, 90, 96.1, 210/96.2, 97, 143, 192, 241, 257.1, 257.2, 259, 335, 340, 341, 760, 764, 806, 195.1, 195.2, 103, 258

[56] References Cited

U.S. PATENT DOCUMENTS

| | | | |
|---|---|---|---|
| 5,547,584 | 8/1996 | Capehart | 210/760 |
| 5,558,775 | 9/1996 | Busch | 210/806 |

FOREIGN PATENT DOCUMENTS

| | | | |
|---|---|---|---|
| 2215391 | 8/1974 | France | 210/241 |
| 2750789 | 5/1979 | Germany | 210/241 |
| 54-150849 | 11/1979 | Japan | 210/241 |
| 1299694 | 12/1989 | Japan | 210/241 |

*Primary Examiner*—Joseph W. Drodge
*Attorney, Agent, or Firm*—Olive & Olive, P.A.

[57] ABSTRACT

The present invention provides a self-contained, self-monitoring water purification system able to be transported to and used in remote areas. The system processes contaminated water through a preliminary filter, an oxidation contact chamber, a secondary filter and a chemical biocidal agent to obtain potable water. A number of sensor probes send information on critical operating parameters to a programmed logic control which, in turn, analyzes the information and generates an output signal to alter system operations when needed. In a second embodiment, the invention system is provided with a desalination unit in the form of a reverse osmosis filter to remove salt and extremely fine particles.

2 Claims, 1 Drawing Sheet

WATER PURIFICATION SYSTEM HAVING PLURAL PAIRS OF FILTERS AND AN OZONE CONTACT CHAMBER

BACKGROUND OF THE INVENTION

1. Field of the Invention

The invention relates to systems for the purification of water and, more particularly, relates to transportable self-contained water purification systems combining filtration and chemical decontamination.

2. Description of the Related Art

Water covers more than two-thirds of the earth's surface. Nevertheless, there are many areas where water is scarce or where water, if available, is not potable. Potable water is suitable for humans and animals to drink.

The majority of the water on earth is brackish or sea water. Brackish water and sea water are typically not suitable for human and animal consumption because they contain salts and sediments which may be harmful. In addition, brackish water and sea water are unsuitable for other desired uses, such as irrigation.

In addition to brackish and sea water, so-called "fresh" water may also be unsuitable for use in certain circumstances. Fresh water may be polluted or contain certain undesirable bacteria or other microorganisms. Water contamination may occur because of intentional or accidental discharge of a variety of materials into the water supply, such as untreated sewage, garbage, industrial and agricultural chemicals as well as because of storms and floods. For these and other reasons, waters found in many locations are not suitable for drinking or other uses.

As is generally known, water may be found in pools at the earth's surface or within the subsurface strata. Surface water may be contaminated by events occurring at the surface. Subsurface water may be polluted by substances seeping through the earth's strata to enter subsurface formations containing the water. In any event, both surface water and water from subsurface strata may require treatment prior to use.

A number of water treatment systems and methods have been previously developed to make the water potable. These facilities typically include numerous tanks, large pumps, filtration apparatus, and chemical treating facilities. For treatment of large amounts of water, such as to supply cities and towns, large-scale water treatment facilities are generally necessary. For smaller-scale water treatment, a variety of apparatus and methods are known in which similar technology is used on a smaller scale.

There have been earlier attempts to develop a transportable, self-contained water purification system capable of treating significantly large quantities of potable water. Those prior systems and methods have not been satisfactory, however, for many water treatment applications. For example, some of the systems and methods have been designed to treat only so-called "fresh" water. Those systems have generally treated the fresh water by filtration and addition of chemical disinfectants. The filtration serves to remove particulate matter from the water and the chemical disinfectants serve to render the water microbiologically suitable. Those systems and method for treating fresh water typically have not been effective to remove dissolved substances in the water, for example, salts, which are found in brackish water and sea water.

Prior attempts for treating brackish and sea water and other waters containing dissolved substances have employed various chemicals and filter processes to prepare the water for subsequent treatment in a separate process known as reverse osmosis. In normal osmosis, a solvent diffuses through a semi-permeable membrane from an area of greater osmotic pressure (i.e. lesser concentration of dissolved substance) to an area of lower osmotic pressure (i.e. greater concentration of dissolved substance). In reverse osmosis, the solvent is forced through a semi-permeable membrane filter under high pressure, leaving dissolved substances, such as salts and other contaminants, behind.

Those prior technology water treatment systems and methods employing reverse osmosis have several limitations. For instance, conventional reverse osmosis systems and methods have had limited throughput capacity and could only treat a restricted range of input water quality. In addition, prior systems and methods of this type have required various consumable chemicals to be added. Thus, these chemicals must be continuously or regularly added.

In the case of a storm or flood, the need to supply clean, potable water is a primary need for the health and survival of the victims. Present methods of transporting clean water to a disaster site in containers is both cumbersome, because of the volume often needed, and unreliable, because of bacterial growth which frequently occurs during storage.

The prior technology portable water purification units have typically employed chlorine for disinfection. The use of chlorine as a pre-oxidant (i.e., prior to filtration) in contaminated water containing humic waste causes the formation of trihalomethanes, which are known carcinogens. Once formed, trihalomethanes are very difficult to remove from the water being treated. Prevention of trihalomethane formation, rather than subsequent removal, is most desirable.

Ozone has been employed on a limited basis in the prior technology, rather than chlorine, as a pre-oxidant to avoid the problem of trihalomethane formation. Ozone use does not result in trihalomethanes formation, but large concentrations of ozone are necessary to accomplish the intense oxidation necessary for water treatment. Ozone is an unstable form of oxygen which cannot be stored. Also, large concentrations of ozone cannot be generated by the known water treatment systems and methods, so it has been necessary to supply ozone to those systems and methods from an external source.

There are at least two known transportable systems for water purification. One of those systems, referred to in the trade as the "global water system LS3", has the disadvantage of not being usable in treating water containing high total dissolved solids (TDS), e.g., brackish and sea waters contain a high level of TDS. Further, in that system manual adjustment of chlorine dosage is required which gives variable treatment results and is subject to human error. That system further includes only a single, non-reusable filter bank which must be periodically replaced, requiring periodic shutdown of the entire system.

The second known portable water purification system is used by the United States Army and is called the "ROWPU" (for reverse osmosis water purification unit). This system requires the addition of a chemical coagulant for aiding removal of fine particles. This coagulant is consumed in the system and so must be continuously, or at least regularly, added to the system by an operator. The operator's involvement may produce variable results. The system also requires the addition of a scale inhibitor that is also consumed during use. The system includes a single-stage cartridge filter that is non-reusable. The cartridge filter is not satisfactory for many applications, as it will pass viruses, giardia, and many types of bacteria. The Army system employs reverse osmosis membranes that tend to foul and must be replaced, and requires the addition of a consumable residual disinfectant that must be added or generated at the system site.

The present invention overcomes the problems of the known prior technology water treatment systems, particularly the transportable systems previously available. In addition to overcoming the problems of the prior known systems, the present invention provides features not found in the prior technology in a number of areas. As will be understood and appreciated by those skilled in the art, the invention provides a significant improvement in the technology. In particular, the invention discloses a water pretreatment by filtration and the addition of ozone which has been found to disinfect the water, which eliminates biofouling of reverse osmosis/desalination membranes; to enhance coagulation of organics for better filtration by granulated carbon and cartridge filters prior to contact with membranes; and to modify the crystalline structure of dissolved solids to eliminate the formation of scale. Therefore, the result is a very clean water in the pretreatment phase to such a degree that it will significantly enhance longevity and effectiveness of existing membranes, thus decreasing system operating costs. This pretreatment process has the distinct advantage of not requiring water softeners or the addition of chemicals traditionally used in reverse osmosis pretreatment, so the system is very environmentally friendly.

It is therefore an object of the present invention to provide a water purification system which is capable of effectively and continuously treating contaminated water in any of several conditions so as to supply potable water.

It is a further object of the present invention to provide a water purification system which is self contained and transportable.

It is an additional object of the present invention to provide a water purification system which is capable of desalinating brackish water or seawater and supplying an output of potable water.

It is still a further object of the present invention to provide a water purification system which enables the cleaning and servicing of components without interruption of water treatment.

It is another object of the present invention to provide a water purification system which is capable of automatically substituting a fresh filter component for a used filter component in need of cleaning or service without interruption of water treatment.

It is a still further object of the present invention to provide a water purification system which is capable of evaluating the quality of treated water at a particular location and recirculating and re-treating portions which are not acceptable.

These and other objects will become more apparent from the description below and the appended claims.

SUMMARY OF THE INVENTION

A first embodiment of the invention is a system for water purification comprising means for filtering water input to the system, means for oxidizing organic substances in the water, means for disinfecting the water by destroying parasites and bacteria and means for inactivating viruses in the water, means for coagulating colloidal particles in the water, and means for disinfecting the water chemically. A second embodiment adds a highly effective reverse osmosis filter with a booster pump to enable the system to purify and desalinate brackish water and sea water.

DETAILED DESCRIPTION OF THE INVENTION AND PREFERRED EMBODIMENTS THEREOF

Figure 1:
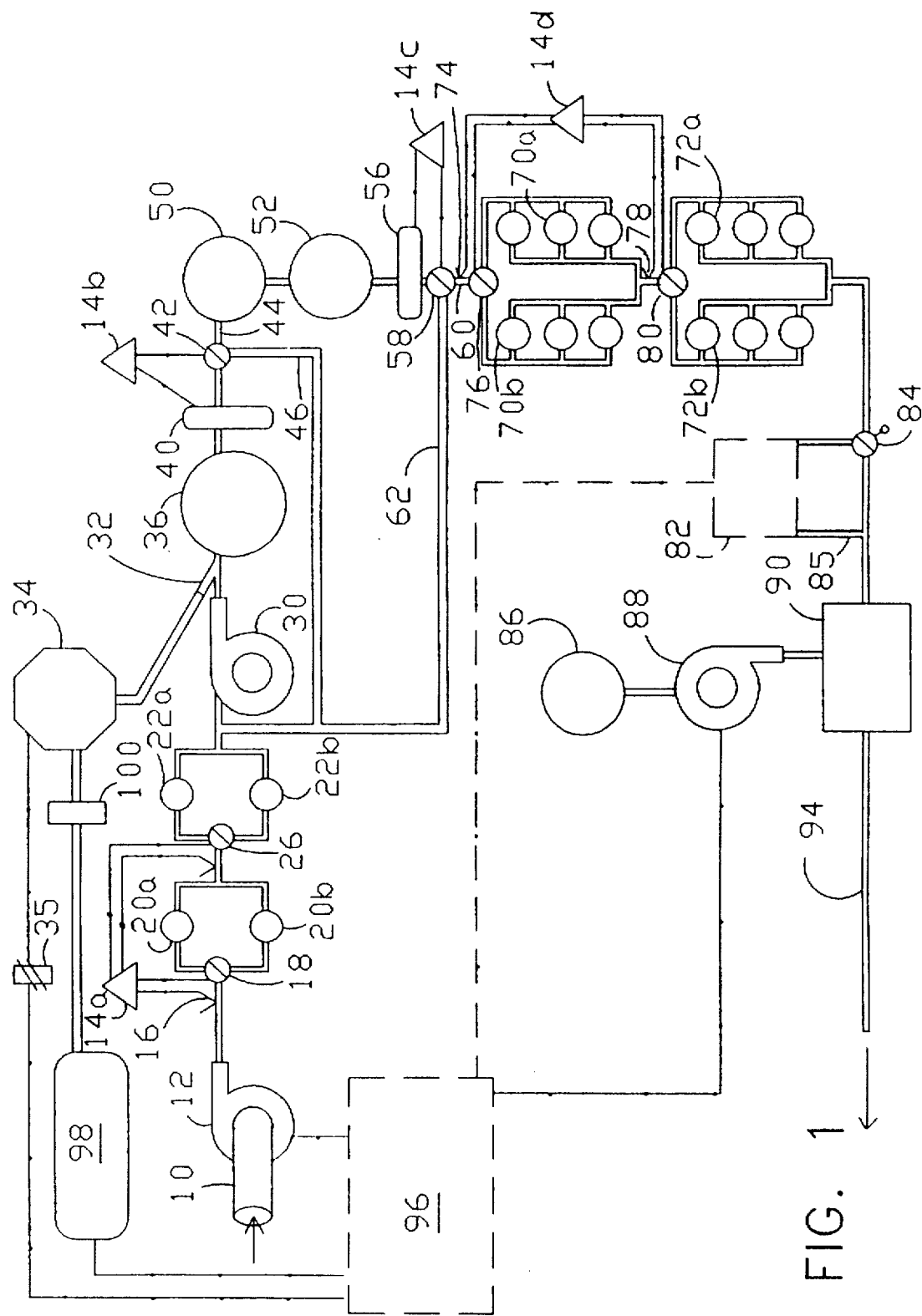
FIG. 1 is a schematic diagram of the water purification system of the present invention including apparatus suitable for both a first and a second embodiment.

The invention disclosed herein is configured as a completely self-contained purification system for treatment of water containing any of a large range of contaminants. The primary purpose of providing a self contained system is to be able to mount it on a trailer for easy placement at the site of a natural disaster or other temporary location. Alternatively, the system may be mounted on a support platform to be moved by land or air to an operating site. According to a third option, the various components of the invention system can be transported individually to be assembled at the location of use, which is particularly practical in the case of a large system adapted to supplying the water needs of a small-to-medium sized population.

As illustrated in FIG. 1, the water purification system of the preferred embodiment is configured as a continuous process apparatus which draws unusable water from a supply, such as a river, by supply pump 12 operating through suction tube 10. In the single FIGURE, fluid transmitting pipes are shown in double lines and electrical wires in single lines with dots along their length. Control is effected by a central microprocessor PLC 14 made up of individual programmable logic controls 14a, 14b, 14c and 14d of any known type and referred to collectively as PLC 14, not shown. The discharge end of supply pump 12 is connected to a solenoid valve 18 which is capable of diverting water flow to either of two similar preliminary filters 20a, 20b, with a filtration porosity size in the range of 20 μm for filtering relatively large size particles. Filters 20a and 20b, referred to collectively as filter 20, not shown are of the cartridge type, having either disposable pleated elements or washable stainless steel elements. In operation, water flows past pressure probe 16 which is installed in the outlet line of pump 12, through solenoid valve 18, and through filter 20a or 20b, whichever is operational. Pressure probe 16 senses a back pressure and sends a responsive signal to programmable logic control (PLC) 14a. If the pressure exceeds a predetermined value which has been programmed into PLC 14a, PLC 14a sends a signal to solenoid valve 18 to divert the water flow to the alternate preliminary filter 20b or 20a. At this time, the element of one of filters 20a or 20b which caused the high pressure reading is free and able to be serviced.

PLC 14 is shown diagrammatically by a representative triangle symbol in a number of locations as 14a, 14b, 14c, 14d in the system of the invention. In practice, PLC 14 is a central microprocessor which is preferably connected and programmed to control the operation of all components of the system as well as to record and compare a number of test parameters used. In practice, PLC 14 controls every component of the system so that efficiency is optimized, components are protected, and the system failure is minimized. For example, starting and stopping the entire system is accomplished through the PLC so as to prevent overload or other damage to its components. Similarly, electrical power is shown as being connected only to the major electromechanical components of the system described, but is actually supplied to many secondary components as well. Electricity may be supplied from any available source. A self-contained gasoline driven electric generator 96 is shown in dashed lines to indicate one possible source of electric power, especially preferred for use in remote locations.

The discharge end of each preliminary filter 20a, 20b feeds to a connective pipe supplying second solenoid valve 26, which also is configured to divert water flow between a pair of secondary filters 22a, 22b, having a filtration porosity size of, for example, 10 μm. Pressure probe 24 is located in the inlet pipe leading to valve 26 and sends a signal to PLC 14a to function identically to that described above.

The output of filters 22a, 22b referred to collectively as filter 22, not shown, connects to venturi pump 30 which operates to increase the pressure of the water flow subsequent to the pressure drop which occurs because of passing through filters 20 and 22 and supplies the pressurized water to the main channel of venturi tube 32.

As noted above, ozone is an unstable form of oxygen and cannot be stored for more than a few minutes. Thus, it is necessary to generate ozone on site if it is to be used in an operating system for continuous supply of potable water. Ozone generator 34 receives high voltage electric power through step-up transformer 35 for use in converting oxygen to ozone. The invention recognizes that ozone generation is more efficient when the supply air is compressed and is also dry. Air compressor 98 is provided to supply compressed air to ozone generator 34 through desiccant device 100. The ozone generated is drawn from ozone generator 34 into the branch channel of venturi tube 32 to mix with the filtered water and to remain in ozone contact chamber 36 for a predetermined time, preferably about four minutes. This step of combining the water with ozone acts to oxidize organic components, to coagulate fine particulate so as to improve downstream filtration and to physically destroy most of the bacteria, viruses and other microbes present in the water. Although it is effective in destroying most of the undesirable parasites in the water, ozone will not cause the formation of trihalomethane, as stated above.

As noted briefly above, by subjecting the contaminated water to the sequential steps of filtration and ozone exposure, later filtration by reverse osmosis through a semi-permeable membrane does not accumulate scale and has far less damaging residue than has been known in the prior technology systems.

A standardized measurement of electrical potential in water treated in a system such as that of the invention disclosed herein relates to the degree of oxidation accomplished in the organic materials through introduction of the ozone. This measurement is known as the oxidation-reduction potential (ORP) and is set by the standards of the World Health Organization to be a minimum of 650 mv as an acceptable indicator of disinfection efficacy. An ORP value of 200 mv (millivolts) is arbitrarily established to evaluate in-process ORP level at a point related to the output of ozone contact chamber 36. ORP probe 40 measures the electrical potential at the output of ozone contact chamber 36 and conveys the ORP value to PLC 14b. If the potential detected exceeds the limits established, PLC 14 signals diverter valve 42 to divert flow from continuing forward through line 44 and sends the water via return line 46 to the inlet of venturi pump 30 for additional ozone treatment.

Once the water flows past diverter valve 42, it enters a first and then a second of a pair of sequential granular activated charcoal (GAC) filters 50, 52. GAC filtration is particularly effective in the removal of organic contaminants and residual ozone from the water being treated and for ozone offgas not absorbed in the water.

Second ORP probe 56 is located at the output of GAC filter 52 and performs a similar function to that discussed above, however communicating with PLC 14c with a required ORP level of 650 mv. A control signal from PLC 14c causes diverter valve 58 to send the water via return line 62 to the inlet side of venturi pump 30 when the ORP value is unacceptable. When the ORP result is acceptable, valve 58 directs water through line 60.

Having the larger sized particles filtered out, the organic chemical materials oxidized and removed, and the objectional microorganisms removed, only very fine sized particles remain in the water. A pair of parallel banks of fine cartridge filters 70a, 70b, for example having a 2 μm porosity, are connected respectively to the dual output ports of diverter solenoid valve 76 which is controlled by PLC 14d according to information received from pressure probe 74 as described above. Filters 70a, 70b are connected so that each bank of three (3) filters operates in parallel to minimize back pressure buildup.

A second set of fine cartridge filters 72 comprising filters 72a, 72b, for example at a pore size of 1 μm, are connected as two parallel banks downstream from filters 70a, 70b to perform a similar function. Pressure probe 78 and diverter valve 80 serve to control back pressure and filter maintenance through PLC 14d.

According to the first embodiment of the invention, the filtered and pre-treated water exiting filters 72 next flows to biocidal mixing tank 90 which receives a prescribed amount of chemical disinfectant, such as, for example, chlorine, from biocide storage tank 86 through biocide pump 88. This final disinfecting step serves to prevent regrowth of any living matter in the water being treated. Subsequently, the treated water is discharged through discharge pipe 94.

In certain circumstances, especially where the supply of water is brackish or sea water, a still finer filter is required to render the water fit for consumption. This final, extremely fine filtration is provided by diverting water flow through a reverse osmosis unit 82 (shown in dashed lines), included in a second preferred embodiment of the invention. As stated above, a reverse osmosis apparatus filters by forcing the water under pressure through a semi-permeable membrane to remove the salt and isolate the solvent. In the case of water containing salt, the salt remains as a residue on the semi-permeable membrane through which the water has been pumped. From the reverse osmosis filtration unit, the water is sent through discharge line 85 to biocidal mixing tank 90 and out through discharge pipe 94. In a combined version of the invention's first and second embodiment, reverse osmosis unit 82 is provided and manually controllable bypass valve 84 is employed to select whether to flow water through or around the reverse osmosis unit.

As disclosed herein, the present invention provides a unique system for the decontamination of water by treating the water with ozone after an initial filtration step and then removing the residue of the ozone exposure with granular activated charcoal. Thereafter, a further filtration is performed, optionally including a reverse osmosis device, especially in the case of water containing salt, and a final chemical disinfectant is added. The resultant water has been found to be suitable for consumption by humans and animals as well as for agricultural purposes.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A system for purifying contaminated water characterized by being self-contained, portable and having means operative during operation of the system and dependent on factors measured within the system for taking clogged filters out of service, placing unclogged filters in service and for recirculating for repeated treatment of both ozone treated water and organic contaminated filtered water during operation of the system, comprising:

(a) a first pump having an intake port connected to a source of contaminated water to be treated by said system and a discharge port through which water pumped by said pump is discharged;

(b) a first pair of replaceable cartridge filters each having intake and exhaust ports;

(c) a first signal controlled valve having an intake port connected to receive water from said first pump discharge port and having a pair of discharge ports each being separately connected to an intake port of one of said first pair of filters enabling water received through the intake port of said first signal controlled valve to be directed to the intake port of a selected one of said first pair of cartridge filters according to a first pressure related control signal applied to said first signal controlled valve;

(d) a second pair of replaceable cartridge filters each having intake and exhaust ports.

(e) a second signal controlled valve having an intake port connected to the exhaust ports of said first pair of cartridge filters to receive water filtered therefrom and having a pair of discharge ports each of which is connected to the intake port of a selected one of said second pair of filters thereby enabling water received through the intake port of said second signal controlled valve to be directed to the intake port of a selected one of said second pair of cartridge filters according to a second pressure related control signal applied to said second signal controlled valve;

(f) a first pressure probe and a second pressure probe being operative to continuously monitor the water pressure on the respective intake sides of said first and second valves and develop said first and second pressure related control signals corresponding thereto;

(g) first control means responsive to said first and second pressure related signals for generating first and second pressure related valve control signals transmitted to said first and second signal controlled valves for switching said first and second signal controlled valves and enabling a filter in either said first or second pair of filters to be taken out of service and the other filter of said pair to be placed in service while the system continues to operate;

(h) a second pump having an intake port connected to the exhaust ports of said second pair of filters and a discharge port;

(i) an ozone generator providing pressurized substantially dry ozone and having an outlet for discharging said ozone from said ozone generator and connected to said second pump discharge port;

(j) an ozone contact chamber having an inlet connected to both said ozone generator outlet and said second pump discharge port thereby enabling water filtered by one of said first pair and one of said second pair of filters and discharged from said second pump discharge port to be mixed within said chamber with ozone from said ozone generator for discharge through an outlet formed on said chamber;

(k) a third signal controlled valve connected on an intake side to said chamber outlet for receiving ozone treated water discharged therefrom and having a first discharge port and a second discharge port, said first discharge port being connected through a first return line to said second pump intake port enabling ozone treated water discharged through said chamber outlet to be directed through either said first discharge port for repeated introduction of ozone and passage through said second pump and ozone contact chamber or to said second discharge port of said third signal controlled valve according to a first oxidation reduction potential (ORP) related valve control signal applied to said third signal controlled valve;

(l) a first ORP probe operative to continuously monitor the oxidation reduction potential of water discharged through said chamber outlet and develop said first ORP signal corresponding thereto;

(m) second control means responsive to said first ORP signal developed by said first ORP probe for generating a third valve control signal transmitted to said third signal controlled valve for switching said third signal controlled valve while the system continues to operate, enabling ozone treated water received by said third signal controlled valve to be directed to either said third signal controlled valve first discharge port for recirculation through said second pump and ozone contact chamber or to said third signal controlled valve second discharge port for further treatment;

(n) a third pair of granulated active carbon (GAG) filters, a first of said pair of GAC filters having an intake port connected to the third signal controlled valve second discharge port and a discharge port connected to an intake port of a second of said third pair of GAC filters and the second of said pair of GAC filters having a discharge port;

(o) a fourth signal controlled valve connected on an intake side to the discharge port of the second of said pair of GAC filters and having first and second discharge ports the first of which is connected to said second pump intake port through a second return line enabling water treated by said GAC filters to be directed through either said fourth signal controlled valve first discharge port for passage through said second pump and repeated introduction of ozone or to the second discharge port of said fourth signal controlled valve for further treatment according to a second ORP related valve control signal applied to said fourth signal controlled valve;

(p) a second ORP probe operative to continuously monitor the oxidation reduction potential of the water discharged from the second of said pair of GAC filters and generate a second ORP signal corresponding thereto;

(q) third control means responsive to said second ORP signal generated by said second ORP probe for generating a second ORP related valve control signal and applied to said fourth signal controlled valve for switching said fourth signal controlled valve according to the ORP level indicated by said second ORP signal enabling water discharged from the second of said GAC filters to be directed to either said fourth signal controlled valve first discharge port for recirculation through said second pump, said ozone contact chamber and both said GAC filters or to said fourth signal controlled valve second discharge port for further treatment;

(r) first and second banks of plural filters, each said bank having respective intake and exhaust ports;

(s) third and fourth banks of plural filters, each said bank having respective intake and exhaust ports;

(t) a fifth signal controlled valve connected on an intake side to receive water from said second discharge port of said fourth signal controlled valve and having a pair of discharge ports each being separately connected to the respective intake ports of said first and second banks of filters enabling water received from said fourth signal controlled valve second discharge port to be selectively directed by said fifth signal controlled valve to one or the other of the intake ports of said first or second banks of filters according to a third pressure related control signal applied to said fifth signal controlled valve;

(u) a sixth signal controlled valve connected on an intake side to the exhaust ports of said first and second banks of filters to receive water discharged therefrom and having a pair of discharge ports each being separately connected to the respective intake ports of said third and fourth banks of filters enabling water received from said first and second banks of filters to be selectively directed by said sixth control valve to one or the other of the intake ports of said third and fourth banks of filters according to a fourth pressure related control signal applied to said sixth signal controlled valve;

(v) a third and a fourth pressure probe operative to continuously monitor the water pressure on the respective intake sides of said fifth and sixth signal controlled valves and generate third and fourth pressure indicating signals corresponding thereto;

(w) fourth control means responsive to the pressure indicator signals generated by said third and fourth pressure probes for developing respective third and fourth pressure related valve control signals applied to said fifth and sixth signal controlled valves for switching said fifth and sixth signal controlled valves according to the respective pressures indicated by the respective third and fourth pressure indicating signals thereby enabling filters in either said first or second banks of filters or in said third or fourth banks of filters to be taken out of service and other filters of said first or second bank of filters or of said third or fourth bank of filters placed in service when the corresponding indicated pressures so require and while the system continues to operate;

(x) a biocidal mixing tank having an intake port connected to the discharge ports of said third and fourth banks of filters and a discharge port for discharging water after being treated within said biocidal mixing tank;

(y) a biocide storage tank containing a biocide;

(z) a third pump connected to pump biocide from said biocide storage tank to said biocide mixing tank thereby enabling water discharged from said third and fourth banks of filters to be treated with said biocide immediately prior to being discharged from said system; and (aa) a microprocessor operatively associated with said first, second, third and fourth control means.

2. A system for purifying contaminated water as claimed in claim 1 including:

(a) a desalinator for desalinating water having an intake port and exhaust port; and (b) pumping means for coupling said desalinator intake port to the exhaust ports of said third and fourth banks of filters and said desalinator exhaust port to said biocidal mixing tank intake port thereby enabling water discharged by said third and fourth banks of filters to be desalinated prior to passing through said biocidal mixing tank.

* * * * *

UNITED STATES PATENT AND TRADEMARK OFFICE
CERTIFICATE OF CORRECTION

PATENT NO. : 5,741,416
DATED      : April 21, 1998
INVENTOR(S) : Gerard F. Tempest, Jr.

It is certified that error appears in the above-identified patent and that said Letters Patent is hereby corrected as shown below:

Column 4, line 41, insert a comma(,) after "shown". (PTO error)

Column 5, line 61, change "PLC 14" to read --PLC 14b--. (PTO error)

Column 7, line 64, after "to" insert --introduce ozone to water discharged from--.

Signed and Sealed this

Twenty-second Day of September, 1998

Attest:

BRUCE LEHMAN

Attesting Officer       Commissioner of Patents and Trademarks